(12) United States Patent
Kwon et al.

(10) Patent No.: US 10,098,151 B2
(45) Date of Patent: Oct. 9, 2018

(54) TRANSMISSION METHOD FOR MULTI USER IN WIRELESS LOCAL AREA NETWORK

(71) Applicant: NEWRACOM, INC., Irvine, CA (US)

(72) Inventors: HyoungJin Kwon, Daejeon (KR); Jeehoon Kim, Daejeon (KR)

(73) Assignee: NEWRACOM, INC., Lake Forest, CA (US)

( * ) Notice: Subject to any disclaimer, the term of this patent is extended or adjusted under 35 U.S.C. 154(b) by 305 days.

(21) Appl. No.: 14/953,213

(22) Filed: Nov. 27, 2015

(65) Prior Publication Data

US 2016/0150514 A1    May 26, 2016

(30) Foreign Application Priority Data

Nov. 26, 2014 (KR) .......................... 10-2014-0166843
Nov. 26, 2015 (KR) .......................... 10-2015-0166243

(51) Int. Cl.
*H04W 72/04*    (2009.01)
*H04W 74/08*    (2009.01)
*H04W 84/12*    (2009.01)

(52) U.S. Cl.
CPC ........ *H04W 74/0816* (2013.01); *H04W 84/12* (2013.01)

(58) Field of Classification Search
CPC .......................... H04W 74/0816; H04W 84/12
See application file for complete search history.

(56) References Cited

U.S. PATENT DOCUMENTS

2014/0307612 A1* 10/2014 Vermani ............... H04L 5/0044
                                                          370/312

OTHER PUBLICATIONS

IEEE P802. 11-REVmc/D5.0, Jan. 2016, sections 21.3.4.5 to 21.3.4.8, pp. 2514-2518.*
"Part 11: Wireless LAN Medium Access Control (MAC) and Physical Layer (PHY) Specifications", IEEE Standards 802.11™ -2012 (Revision of IEEE Standard 802.11-2007), Mar. 29, 2012, pp. 1-2695, IEEE (The Institute of Electrical and Electronic Engineers, Inc.), New York, NY, USA.
"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™ -2013, 2013, pp. 1-395, IEEE (The Institute of Electrical and Electronic Engineers, Inc.), New York, NY, USA.
"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

* cited by examiner

*Primary Examiner* — Melvin Marcelo

(57) ABSTRACT

Disclosed are multi-user transmission methods in a wireless local access network (WLAN). An operation method performed in a first station may comprise generating a physical layer convergence procedure (PLCP) protocol data unit (PPDU) including a legacy preamble, a high efficiency (HE) preamble, and a payload; and transmitting the PPDU. Also, the HE preamble may include a HE signal A (HE-SIG-A) field, a HE signal B (HE-SIG-B) field, a HE short training field (HE-STF), and a HE long training field (HE-LTF), and the HE-SIG-A field may include information indicating the number of symbols of the HE-SIG-B field. Accordingly, a performance of the WLAN may be enhanced.

8 Claims, 9 Drawing Sheets

TRANSMISSION METHOD FOR MULTI USER IN WIRELESS LOCAL AREA NETWORK

CROSS-REFERENCE TO RELATED APPLICATIONS

This application claims priorities to Korean Patent Application No. 10-2014-0166843 filed on Nov. 26, 2014, and Korean Patent Application No. 10-2015-0166243 filed on Nov. 26, 2015, the entire contents of which are hereby incorporated by reference.

BACKGROUND

1. Technical Field

The present disclosure relates to a wireless local area network (WLAN) technology, and more particularly to a technology for multi-user transmissions.

2. Related Art

With the development of information communication technologies, a variety of wireless communication technologies have been developed. Among these technologies, wireless local area network (WLAN) is a technology that Internet access is possible in a wireless way in homes, business or specific service providing areas, using portable terminal such as personal digital assistant (PDA), a laptop computer, a portable multimedia player (PMP), or the like, based on wireless frequency technologies.

WLAN technologies are created and standardized by the IEEE 802.11 Working Group under IEEE 802 Standard Committee. As such WLAN technology becomes more prevalent and its applications become more diverse, there is increasing demand for new WLAN technology that can support a higher throughput than existing WLAN technologies. Very high throughput (VHT) WLAN technology is proposed to support a data rate of 1 Gbps and higher. A WLAN technology according to IEEE 802.11ac standard is a technology providing VHT in sub 6 GHz band, and A WLAN technology according to IEEE 802.11ad standard is a technology providing VHT in 60 GHz band.

In addition to the above-described standards, various standards on WLAN technologies have been developed, and are being developed. As representative recent technologies, a WLAN technology according to IEEE 802.11af standard is a technology which has been developed for WLAN operation in TV white space bands, and a WLAN technology according to IEEE 802.11ah standard is a technology which has been developed for supporting a great number of stations operating with low power in sub 1 GHz band, and a WLAN technology according to IEEE 802.11ai standard is a technology which has been developed for supporting fast initial link setup (FILS) in WLAN systems. Also, IEEE 802.11 ax standard is being developed for enhancing frequency efficiency of dense environments in which numerous access points and stations exist.

In the system based on such the WLAN technologies, a multi-user transmission can be performed. The multi-user transmission may include an orthogonal frequency division multiple access (OFDMA) based uplink and downlink transmission, a multi user multiple input multiple output (MU-MIMO) based uplink and downlink transmission, and so on. In a case that the multi-user transmission between stations is performed, information needed for the multi-user transmission may be signaled to respective stations participating in the multi-user transmission.

SUMMARY

Accordingly, exemplary embodiments of the present disclosure are provided to substantially obviate one or more problems due to limitations and disadvantages of the related art. Exemplary embodiments of the present disclosure provide various operation methods of a station supporting a multi-user transmission in a WLAN.

In order to achieve the above-described objectives, an aspect of an operation method of a first station in a WLAN may comprise generating a physical layer convergence procedure (PLCP) protocol data unit (PPDU) including a legacy preamble, a high efficiency (HE) preamble, and a payload; and transmitting the PPDU, wherein the HE preamble includes a HE signal A (HE-SIG-A) field, a HE signal B (HE-SIG-B) field, a HE short training field (HE-STF), and a HE long training field (HE-LTF), and the HE-SIG-A field includes information indicating a number of symbols of the HE-SIG-B field.

Here, the number of symbols of the HE-SIG-B field may be indicated based on transmission bandwidth information of the PPDU included in the HE-SIG-A field.

Here, the number of symbols of the HE-SIG-B field may be indicated based on transmission bandwidth information of the PPDU and information on a size of resource allocated to a station receiving the PPDU included in the HE-SIG-A field.

Here, the number of symbols of the HE-SIG-B field may be indicated based information on a number of stations receiving the PPDU included in the HE-SIG-A field.

Here, the HE-SIG-A field may further include information indicating a modulation and coding scheme (MCS) applied to the HE-SIG-B field.

Here, the HE-SIG-B field may be repeated in time domain.

Here, the HE-SIG-B field may include resource allocation information of a station receiving the PPDU.

In order to achieve the above-described objectives, another aspect of the operation method of a first station in a WLAN may comprise obtaining a legacy preamble included in a physical layer convergence procedure (PLCP) protocol data unit (PPDU) received from a second station; obtaining a high efficiency (HE) preamble included in the PPDU; and obtaining a payload included in the PPDU based on information included in the HE preamble, wherein the HE preamble includes a HE signal A (HE-SIG-A) field, a HE signal B (HE-SIG-B) field, a HE short training field (HE-STF), and a HE long training field (HE-LTF), and the HE-SIG-A field includes information indicating a number of symbols of the HE-SIG-B field.

Here, the number of symbols of the HE-SIG-B field may be indicated based on transmission bandwidth information of the PPDU included in the HE-SIG-A field.

Here, the number of symbols of the HE-SIG-B field may be indicated based on transmission bandwidth information of the PPDU and information on a size of resource allocated to a station receiving the PPDU included in the HE-SIG-A field.

Here, the number of symbols of the HE-SIG-B field may be indicated based information on a number of stations receiving the PPDU included in the HE-SIG-A field.

Here, the HE-SIG-A field may further include information indicating a modulation and coding scheme (MCS) applied to the HE-SIG-B field.

Here, the HE-SIG-B field may be repeated in time domain.

Here, the HE-SIG-B field may include resource allocation information of a station receiving the PPDU.

According to the exemplary embodiments of the present disclosure, in the case that the MU transmission is performed, the resource allocation information for each station participating in the MU transmission may be included in the HE-SIG field (e.g., the HE-SIG-A field, the HE-SIG-B field, etc.) of the PPDU. Also, each station may identify a resource allocated to it based on the resource allocation information, and decode signals received through the identified resource. Among information needed for the MU transmission (e.g., the resource allocation information, etc.), common information may be transmitted through a whole frequency band, and user-specific (STA-specific) information may be transmitted through a frequency band (or, at least one spatial stream) allocated to the corresponding STA. The information needed for transmission may vary according to the transmission manner of the PPDU (e.g., OFDM, OFDMA, SU-MIMO, MU-MIMO, etc.), and accordingly structures of the preambles included in the PPDU may be changed. Through this, the performance of the WLAN can be enhanced.

BRIEF DESCRIPTION OF DRAWINGS

Exemplary embodiments of the present disclosure will become more apparent by describing in detail exemplary embodiments of the present disclosure with reference to the accompanying drawings, in which.

DETAILED DESCRIPTION

Figure 1:
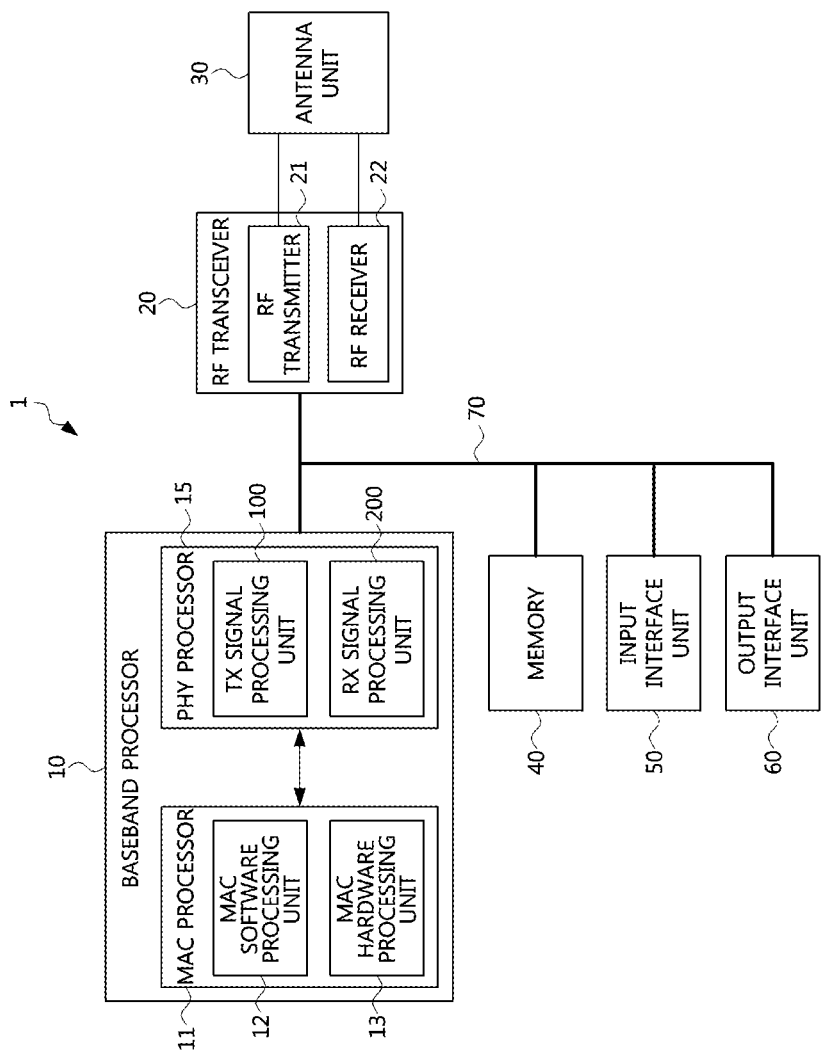
FIG. 1 is a block diagram illustrating a structure of a WLAN device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to IEEE (Institute of Electrical and Electronics Engineers) 802.11 standard. In the plurality of WLAN devices, at least one WLAN device may be an access point and the other WLAN devices may be non-AP stations (non-AP STAs). Alternatively, all the plurality of WLAN devices may be non-AP STAs in Ad-hoc networking. In general, the AP STA and the non-AP STA may be collectively called the STA. However, for easy description, only the non-AP STA may be called the STA.

FIG. 1 is a block diagram illustrating a structure of a WLAN device.

Referring to FIG. 1, the WLAN device 1 may include a baseband processor 10, a radio frequency (RF) transceiver 20, an antenna unit 30, a memory 40, an input interface unit 50, an output interface unit 60, and a bus 70. The baseband processor 10 may perform baseband signal processing, and may include a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, the MAC processor 11 is not limited to this. The PHY processor 15 may include a transmitting signal processing unit 100 and a receiving signal processing unit 200.

The baseband processor 10, the memory 40, the input interface unit 50, and the output interface unit 60 may communicate with each other via the bus 70. The RF transceiver 20 may include an RF transmitter 21 and an RF receiver 22. The memory may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
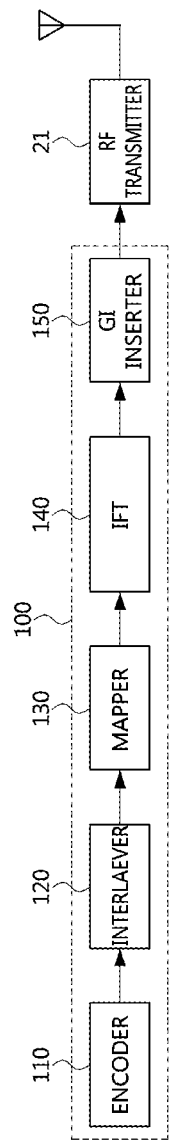
FIG. 2 is a schematic block diagram illustrating a transmitting signal processing unit in a WLAN.

FIG. 2 is a schematic block diagram illustrating a transmitting signal processing unit in a WLAN.

Referring to FIG. 2, a transmitting signal processing unit 100 may include an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers corresponding to the number of NSS of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the NSS spatial streams into NSTS space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper. When the MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
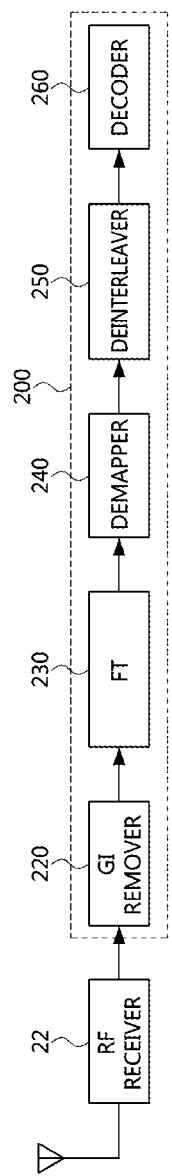
FIG. 3 is a schematic block diagram illustrating a receiving signal processing unit in the WLAN.

FIG. 3 is a schematic block diagram illustrating a receiving signal processing unit in the WLAN.

Referring to FIG. 3, a receiving signal processing unit 200 may include a GI remover 220, a Fourier transformer (FT) 230, a demapper 240, a deinterleaver 250, and a decoder 260. An RF receiver 22 receives an RF signal via the antenna unit 30 and converts the RF signal into the symbols. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain. When the MIMO or the MU-MIMO is used, the receiving signal processing unit 200 may a spatial demapper for converting the Fourier transformed receiver chains to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder 260, the receiving signal processing unit 100 may not use the encoder deparser.

Figure 4:
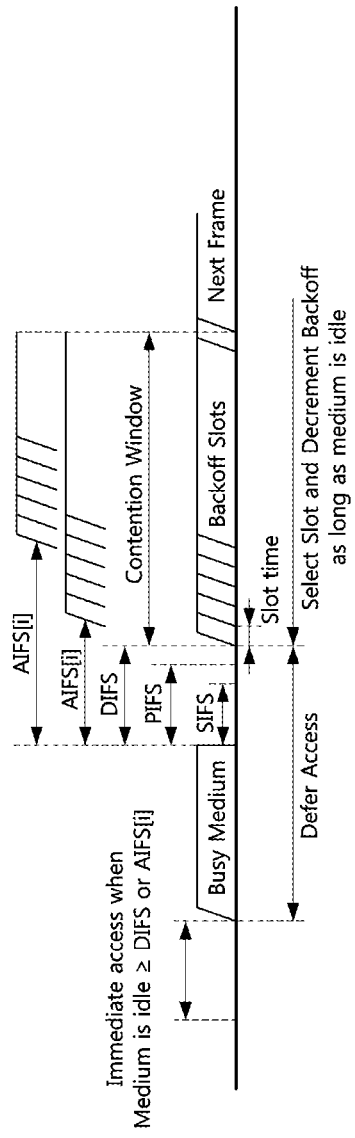
FIG. 4 is a timing diagram illustrating interframe space (IFS) relationships.

FIG. 4 is a timing diagram illustrating interframe space (IFS) relationships.

Referring to FIG. 4, a data frame, a control frame, or a management frame may be exchanged between WLAN devices. The data frame is used for transmission of data forwarded to a higher layer. The WLAN device transmits the data frame after performing backoff if a distributed coordination function IFS (DIFS) has elapsed from a time when the medium has been idle.

The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for access category (AC), i.e., AIFS[AC] has elapsed. In this case, the data frame, the management frame, or the control frame which is not the response frame may use the AIFC[AC].

Figure 5:
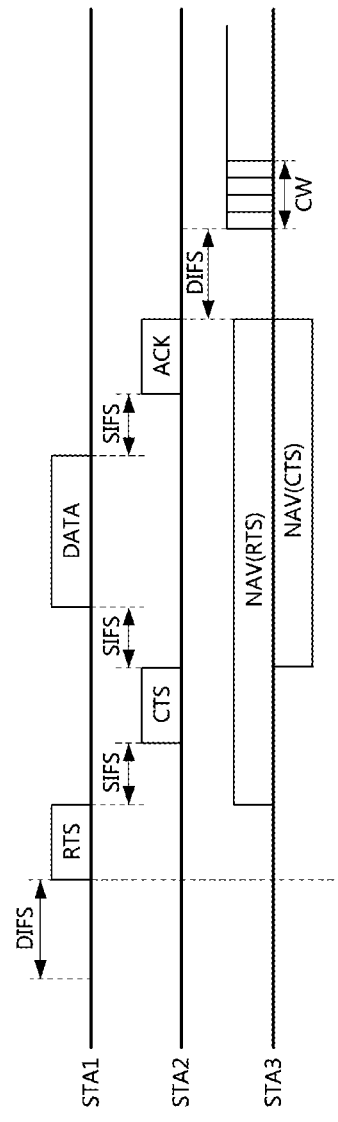
FIG. 5 is a timing diagram illustrating a frame transmission procedure based on a CSMA (carrier sense multiple access)/CA (collision avoidance) manner for avoiding collision between frames in a channel.

FIG. 5 is a timing drawing illustrating a frame transmission procedure based on a CSMA (carrier sense multiple access)/CA (collision avoidance) manner for avoiding collision between frames in a channel.

Referring to FIG. 5, STA1 is a transmit WLAN device for transmitting data, STA2 is a receive WLAN device for receiving the data, and STA3 is a WLAN device which may be located at an area where a frame transmitted from the STA1 and/or a frame transmitted from the STA2 can be received by the WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When determining that the channel is not used by other devices during DIFS (that is, the channel is idle), the STA1 may transmit an RTS frame to the STA2 after performing backoff. Upon receiving the RTS frame, the STA2 may transmit a CTS frame as a response of the CTS frame after SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When the STA3 receives the CTS frame, it may set the NAV timer for a transmission duration of subsequently transmitted frames (for example, a duration of SIFS+data frame duration+SIFS+ACK frame duration) by using duration information included in the RTS frame. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, the STA3 may determine whether the channel is busy by the carrier sensing. Upon determining that the channel is not used by the other devices during DIFS after the NAV timer has expired, the STA3 may attempt the channel access after a contention window according to random backoff operation.

Figure 6:
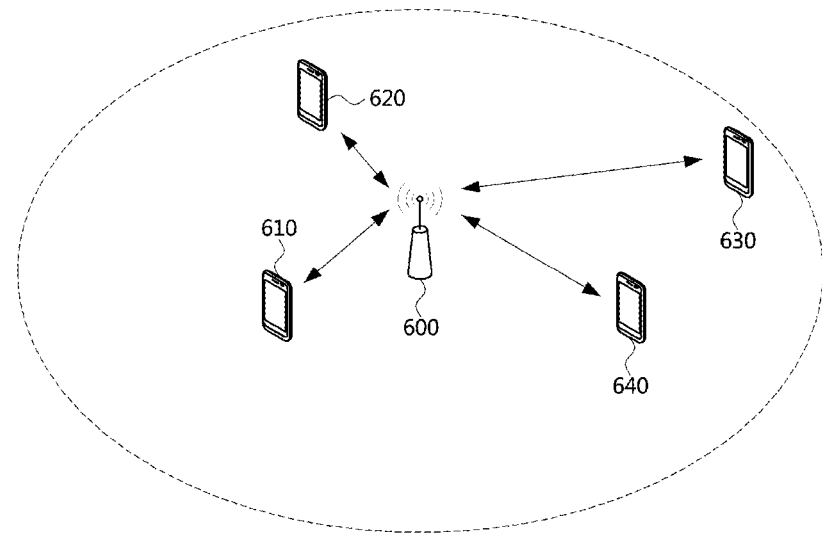
FIG. 6 is a conceptual diagram illustrating an exemplary embodiment of a WLAN topology.

FIG. 6 is a conceptual diagram illustrating an exemplary embodiment of a WLAN topology.

Referring to FIG. 6, a first station (STA1) 610, a second station (STA2) 620, a third station (STA3) 630, and a fourth station (STA4) 640 may be located in a coverage of an access point (AP) 600, and be associated with the AP 600. The AP 600 and the STAs 610, 620, 630 and 640 may perform a single user (SU) transmission or a multi user (MU) transmission. The SU transmission may include an OFDM based uplink/downlink (UL/DL) transmission, a 'SU-MIMO and OFDM' based UL/DL transmission, etc. Also, the MU transmission may include an OFDMA based UL/DL transmission, a 'SU-MIMO and OFDMA' based UL/DL transmission, a 'MU-MIMO and OFDM' based UL/DL transmission, a 'MU-MIMO and OFDMA' based UL/DL transmission, etc.

The AP 600 and the STAs 610, 620, 630, and 640 may perform the SU transmission or the MU transmission in unit of 20 MHz bandwidth (e.g., by using a bandwidth of 20 MHz, 40 MHz, 80 MHz, or 160 MHz, etc.), or perform the SU transmission or the MU transmission in unit of bandwidth smaller than 20 MHz (e.g., 10 MHz, 5 MHz, 2.5 MHz, etc.). For subcarrier spacing of 312.5 kHz, 156.25 kHz, or 78.125 kHz, a frequency band having a width of 20 MHz may respectively include 64 subcarriers, 128 subcarriers, and 256 subcarriers. Also, the MU transmission can be performed in unit of 10 MHz, 5 MHz, or 2.5 MHz.

Hereinafter, the OFDM based DL transmission method, the 'SU-MIMO and OFDM' based DL transmission method, and the 'MU-MIMO and OFDM' based DL transmission method will be explained.

Figure 7:
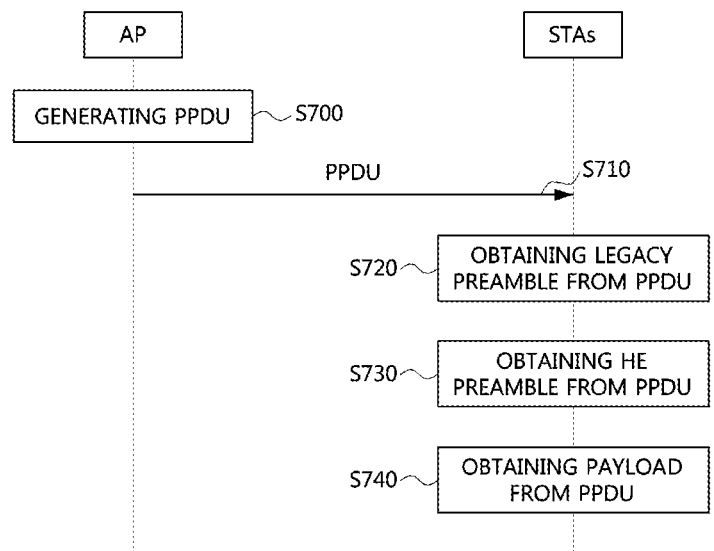
FIG. 7 is a sequence chart illustrating an exemplary embodiment of a downlink transmission in a WLAN.

FIG. 7 is a sequence chart illustrating an exemplary embodiment of a downlink transmission in a WLAN.

Referring to FIG. 7, an AP may be the AP 600 explained in FIG. 6, and STAs may be the STAs 610, 620, 630, and 640 explained in FIG. 6. The AP and STAs may construct the WLAN topology explained in FIG. 6. The AP may perform the OFDM based DL transmission, the 'SU-MIMO and OFDM' based DL transmission, the 'MU-MIMO and OFDM' based DL transmission, etc., and the STAs may perform operations corresponding to the operations of the AP. Here, the AP may generate a physical layer convergence procedure (PLCP) protocol data unit (PPDU) (S700). The PPDU may have a structure which will be explained below. However, the structure of the PPDU is not restricted to the below explanation, and may have one or a combination of various structures.

Figure 8:
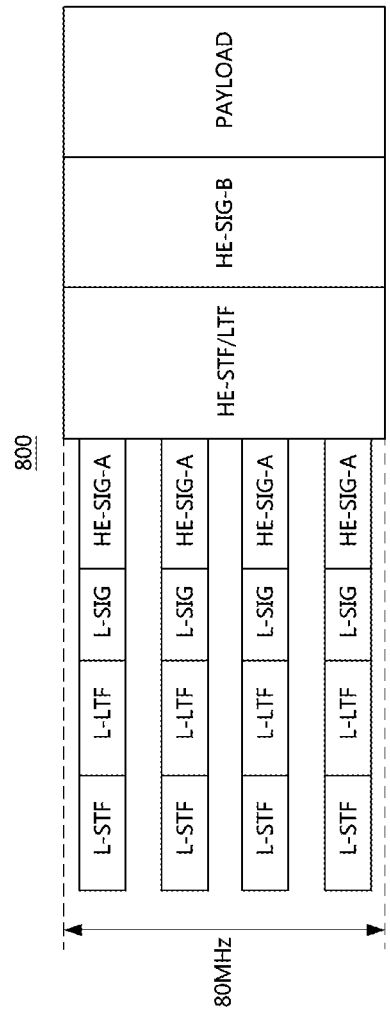
FIG. 8 is a block diagram illustrating a first exemplary embodiment of a PPDU.

FIG. 8 is a block diagram illustrating a first exemplary embodiment of a PPDU.

Referring to FIG. 8, a PPDU 800 may include a legacy preamble, a high efficiency (HE) preamble, and a payload. The legacy preamble may include a legacy short training field (L-STF), a legacy long training field (L-LTF), and a legacy signal (L-SIG) field. In a case that a transmission bandwidth of the PPDU 800 is 80 MHz, the fields included in the legacy preamble may be duplicated in unit of 20 MHz. The HE preamble may include a HE signal A field (HE-SIG-A) field, a HE short training field (HE-STF), a HE long training field (HE-LTF), and a HE signal B (HE-SIG-B) field. In the case that the transmission bandwidth of the PPDU 800 is 80 MHz, the HE-SIG-A field may be duplicated in unit of 20 MHz, and the HE-STF, HE-LTF, and HE-SIG-B field may be transmitted through the 80 MHz bandwidth. The HE-SIG-A field may include at least one of information elements listed in a below table 1.

TABLE 1

| Information Elements |
| --- |
| Bandwidth indicator |
| UL/DL indicator |
| OFDM/OFDMA indicator |
| SU/MU indicator |
| STA identifier |
| BSS identifier |
| $N_{STS}$ |
| STBC |

The bandwidth indicator may indicate a transmission bandwidth of the PPDU 800 (e.g., 20 MHz, 40 MHz, 80 MHz, 160 MHz, etc.). For example, the bandwidth indicator included in the PPDU 800 may indicate a bandwidth of 80 MHz. For example, if the bandwidth indicator is configured as binary values '00,' '01,' '10,' or '11,' this may respectively indicate a 20 MHz bandwidth, a 40 MHz bandwidth, a 80 MHz bandwidth, or a 160 MHz bandwidth. In a case that the frequency band through which the PPDU 800 is transmitted is non-contiguous, the bandwidth indicator may indicate a bandwidth of the non-contiguous frequency band. The UL/DL indicator may indicate whether the transmission of the PPDU 800 is UL transmission or DL transmission. For example, the UL/DL indicator included in the HE-SIG-A field of the PPDU 800 may indicate the DL transmission. For example, if the UL/DL indicator is configured as a binary value '0' or '1,' this may respectively indicate that the transmission of the corresponding PPDU is UL transmission or DL transmission.

The OFDM/OFDMA indicator may indicate whether the transmission of the PPDU is an OFDM based transmission or an OFDMA based transmission. For example, the OFDM/OFDMA indicator included in the HE-SIG-A field of the PPDU 800 may indicate that the transmission of the PPDU 800 is an OFDM based transmission. For example, in a case that the OFDM/OFDMA indicator is configured as '0' or '1,' this may respectively indicate that the transmission of the PPDU is an OFDM based transmission or an OFDMA based transmission. In the case that the OFDM/OFDMA indicator indicates the OFDM based transmission, a HE-SIG field adjacent to the HE-SIG-A field (e.g., a HE-SIG field existing between the HE-SIG-A field and the HE-STF) may not exist in the PPDU 800. The SU/MU indicator may indicate whether the transmission of the PPDU is SU transmission or MU transmission. For example, in a case that the PPDU 800 is transmitted based on OFDM or 'SU-MIMO and OFDM,' the SU/MU indicator may indicate the SU transmission. Meanwhile, in a case that the PPDU 800 is transmitted based on 'MU-MIMO and OFDM,' the SU/MU indicator may indicate the MU transmission. For example, in a case that the SU/MU indicator is configured as '0' or '1,' this may respectively indicate that the transmission of the PPDU is SU transmission or MU transmission. Also, if the SU/MU indicator is configured as '1,' this may also indicate that the MU-MIMO is applied to a whole bandwidth of the PPDU 800. When the OFDM/OFDMA indicator indicates the OFDM based transmission, the SU/MU indicator may exist in the HE-SIG-A field of the PPDU 800. On the contrary, when the OFDM/OFDMA indicator indicates the OFDMA based transmission, the SU/MU indicator may not exist in the HE-SIG-A field of the PPDU 800.

The STA identifier may indicate at least one station receiving the PPDU 800. In the case that the PPDU 800 is transmitted based on OFDM or 'SU-MIMO and OFDM,' an association identifier (AID) or a partial AID (PAID) may be used as the STA identifier. In the case that the PPDU 800 is transmitted based on 'MU-MIMO and OFDM,' a group identifier may be used for the STA identifier. Here, the group identifier may indicate a group including a plurality of stations. The STA identifier is not restricted to the above examples. For example, the STA identifier may be jointly encoded with information included in the HE preamble (e.g., the HE-SIG-A field or the HE-SIG-B field).

The BSS identifier may indicate a BSS to which the AP transmitting the PPDU 800 belongs. Additionally or alternatively, the BSS identifier may be used for a station receiving the PPDU 800 to identify whether the BSS to which the AP transmitting the PPDU 800 belongs is a BSS to which the station receiving the PPDU 800 belongs or an overlapping BSS. For example, the BSS identifier may be a BSS identifier (BSSID) or a BSS color.

Here, the BSS color may include a value indicating a BSS to which the AP transmitting the PPDU 800 belongs. A communication entity (e.g., an AP or a STA) may configure a value as a BSS color representing a BSS to which it belongs. For example, when the BSS color is represented with three bits, eight BSSs may be discriminated by using the BSS color value. The value of the BSS color may be configured as one of 0 to 7 through negotiations among access points, and the configured BSS color value may be maintained while the corresponding BSS is existing. Communication entities (e.g., an AP or STAs) belonging to the same BSS may have the same BSS color value. That is, the BSS color values included in HE-SIG-A fields of PPDUs generated by communication entities belonging to the same BSS may be configured as the same value.

For example, a station having received PPDU 800 may obtain a BSS color value from the HE-SIG-A field of the PPDU 800, and identify that the BSS to which the AP transmitting the PPDU 800 is identical to the BSS to which it belongs, when the obtained BSS color value (e.g., 1) is identical to a BSS color of it (e.g., 1). On the contrary, the station having received PPDU 800 may identify that the BSS to which the AP transmitting the PPDU 800 is different from the BSS to which it belongs, when the obtained BSS color value (e.g., 2) is different from the BSS color of it (e.g., 1). In this case, the station may not decode subsequent fields (e.g., fields subsequent to the HE-SIG-A field or fields subsequent to the HE preamble), and may operate in doze mode. Also, the station may transition from the doze mode to an awake mode after end time of the PPDU 800. The configuration of the BSS color value is not restricted to the above example. That is, the BSS color value may be configured in one or a combination of various manners.

The $N_{STS}$ may indicate the number of space-time streams. Also, the space-time block coding (STBC) information element may indicate dimensionality of an applied STBC. That is, the number of spatial streams allocated to a station receiving the PPDU 800 may be indicated by the $N_{STS}$ and the STBC. In the case that the PPDU 800 is transmitted based on OFDM, each of the $N_{STS}$ and the STBC may be configured as '0,' or each of the $N_{STS}$ and the STBC may not exist in the HE-SIG-A field of the PPDU 800. In the case that the PPDU 800 is transmitted based on 'SU-MIMO and OFDM' or 'MU-MIMO and OFDM,' each of the $N_{STS}$ and the STBC may be configured as a value other than '0.' In the case that the PPDU 800 is transmitted based on 'MU-MIMO and OFDM,' each of the $N_{STS}$ and the STBC may be configured for each station.

The HE-SIG-B field may include modulation and coding scheme (MCS) information of the payload, length information of the payload, etc. The payload may include at least one data unit. Meanwhile, PPDUs used for the OFDM based UL transmission, the 'SU-MIMO and OFDM' based UL transmission, and the 'MU-MIMO and OFDM' based UL transmission may have the same or similar structures as the PPDU 800 explained by referring to FIG. 8.

Re-referring to FIG. 7, the AP may transmit the PPDU 800 (S710). In the case of the OFDM based DL transmission or the 'SU-MIMO and OFDM' based DL transmission, the AP may transmit the PPDU 800 to a single station. In the case of the 'MU-MIMO and OFDM' based DL transmission, the AP may transmit the PPDU 800 to a plurality of stations.

A STA may obtain the legacy preamble included in the PPDU 800 received from the AP (S720), and obtain the HE preamble included in the PPDU 800 (S730). The STA may identify the transmission bandwidth of the PPDU 800 based on the bandwidth indicator included in the HE-SIG-A field of the PPDU 800, identify that the transmission of the PPDU 800 is DL transmission based on the UL/DL indicator included in the HE-SIG-A field, and identify whether the transmission of the PPDU 800 is SU transmission or MU transmission based on the SU/MU indicator included in the HE-SIG-A field of the PPDU 800. Also, the STA may identify whether it is a target STA of the PPDU 800 or not based on the STA identifier included in the HE-SIG-A field, and identify the BSS to which the AP transmitting the PPDU 800 belongs based on the BSS identifier included in the HE-SIG-A field. The STA may identify spatial streams allocated to it based on the $N_{STS}$ and STBC included in the HE-SIG-A field of the PPDU 800.

Also, the STA may identify a MCS of the payload based on the MCS information included in the HE-SIG-B field of the PPDU 800, and identify the length of the payload based on the length information included in the HE-SIG-B field. The STA may obtain the payload of the PPDU 800 based on the information included in the HE preamble, etc. (S740). Upon successfully receiving the PPDU 800, in response to the PPDU 800, the STA may transmit an acknowledgement (ACK) frame to the AP.

Hereinafter, the OFDMA based DL transmission method, the 'SU-MIMO and OFDMA' based DL transmission method, and the 'MIU-MIMO and OFDMA' based DL transmission method will be explained.

Re-referring to FIG. 7, the AP may perform the OFDMA based DL transmission, the 'SU-MIMO and OFDMA' based DL transmission, and the 'MU-MIMO and OFDMA' based DL transmission, etc., and the STAs may perform operations corresponding to the operation of the AP. The AP may generate a PPDU (S700). The PPDU may have structures which will be explained below. The structure of the PPDU is not restricted to the below examples. That is, the PPDU may have one of various structures.

Figure 9:
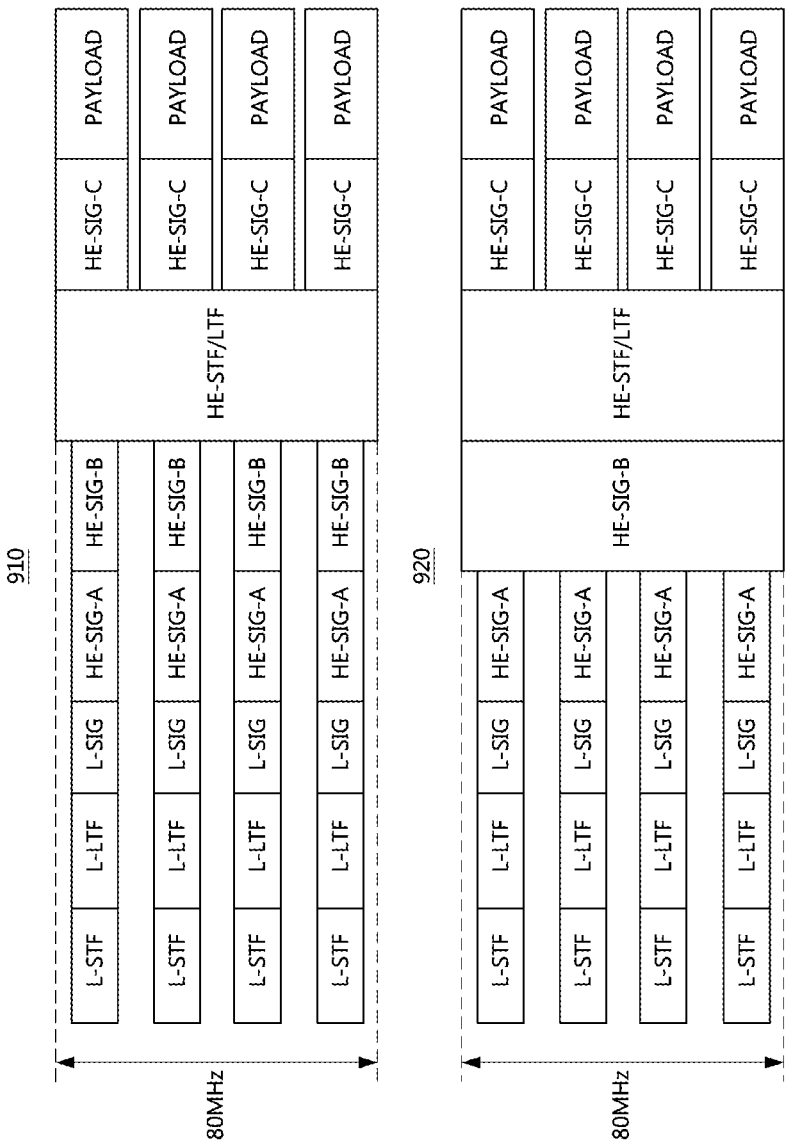
FIG. 9 is a block diagram illustrating a second exemplary embodiment and a third exemplary embodiment of a PPDU.

FIG. 9 is a block diagram illustrating a second exemplary embodiment and a third exemplary embodiment of a PPDU.

Referring to FIG. 9, each of PPDUs 910 and 920 may include a legacy preamble, a HE preamble, and a payload. The legacy preamble may include a L-STF, a L-LTF, and a L-SIG field. In a case that a transmission bandwidth of each of the PPDUs 910 and 920 is 80 MHz, fields included in the legacy preamble may be duplicated in unit of 20 MHz. The HE preamble may include a HE-SIG-A field, a HE-SIG-B field, a HE-STF, a HE-LTF, and a HE signal C (HE-SIG-C) field. The fields included in the HE preamble are not restricted to the above example, and the HE preamble may be constructed in various manners. For example, the HE preamble may be constituted with a HE-SIG-A field, a HE-SIG-B field, a HE-STF, and a HE-LTE In the case that the transmission bandwidth of the PPDU 910 is 80 MHz, the HE-SIG-A field and the HE-SIG-B field may be duplicated in unit of 20 MHz, and the HE-STF and the HE-LTF may be transmitted through the bandwidth of 80 MHz. In the case that the transmission bandwidth of the PPDU 920 is 80 MHz, the HE-SIG-A field may be duplicated in unit of 20 MHz, and the HE-SIG-B field, the HE-STF, and the HE-LTF may be transmitted through the bandwidth of 80 MHz. Here, the HE-SIG-B field may be repeated in time domain at least once. In this case, a signal-to-noise ratio (SNR) of the HE-SIG-B field at a receiving end may increase. In the case that the HE-SIG-B field is repeated, this may be indicated by a repetition indicator included in the HE-SIG-A field. The HE-SIG-A field may include at least one of information elements listed in a below table 2.

TABLE 2

| Information Elements |
| --- |
| Bandwidth indicator |
| UL/DL indicator |
| OFDM/OFDMA indicator |
| STA identifier |
| BSS identifier |
| Resource allocation structure indicator |
| STA number indicator |

TABLE 2-continued

| Information Elements |
| --- |
| Symbol indicator |
| MCS indicator |

Each of the bandwidth indicator, the UL/DL indicator, the OFDM/OFDMA indicator, the STA identifier, and the BSS identifier may be identical to the corresponding information element explained by referring to the table 1. For example, the bandwidth indicator may indicate the bandwidth of 80 MHz, the UL/DL indicator may indicate the DL transmission, and the OFDM/OFDMA indicator may indicate the OFDMA transmission. Also, a group identifier may be used as the STA identifier.

Also, the HE-SIG-A field may further include a repetition indicator representing whether the HE-SIG-B field subsequent to the HE-SIG-A field is repeated or not. For example, the repetition indicator may be configured as '0' or '1', and this may respectively indicate that the HE-SIG-B field is not repeated or the HE-SIG-B field is repeated.

The resource allocation structure indicator may indicate the size of resource (e.g., time resource, frequency resource, spatial stream, etc.) allocated to a station receiving the PPDU 910 or 920. For example, the resource allocation structure indicator may indicate the minimum size of resource allocated to the receiving station. The STA number indicator may indicate the number of STAs receiving the PPDU 910 or 920 (i.e., the number of STAs participating in the MU transmission). The symbol number indicator may indicate the number of symbols of the HE-SIG-B field subsequent to the HE-SIG-A field (e.g., the size of the HE-SIG-B field).

On the other hand, the HE-SIG-B field may include resource allocation information, and the resource allocation information may include at least one of time resource allocation information, frequency resource allocation information, and spatial resource information for each receiving station. The number of symbols of the HE-SIG-B field may vary according to the amount of information (e.g., resource allocation information, etc.) included in the HE-SIG-B field. In this case, the number of symbols of the HE-SIG-B field may be indicated by using at least one of the bandwidth indicator, the resource allocation structure indicator, the station number indicator, and the symbol number indicator. As the first method, the number of symbols of the HE-SIG-B field may be predetermined according to the transmission bandwidth of the PPDU 910 or 920, and the station receiving the PPDU 910 or 920 may identify the number of symbols of the HE-SIG-B field based on the bandwidth indicator included in the HE-SIG-A field. For example, the number of symbols of the HE-SIG-B field may be proportional to the size of the transmission bandwidth of the PPDU 910 or 920.

As the second method, the number of symbols of the HE-SIG-B field may be predetermined according to the transmission bandwidth and the resource allocation structure of the PPDU 910 or 920, and the station receiving the PPDU 910 or 920 may identify the number of symbols of the HE-SIG-B field based on the transmission bandwidth and the resource allocation structure of the PPDU 910 or 920. For example, in a case that the PPDU 910 or 920 has a relatively wide transmission bandwidth and a large amount of resource is allocated to the station, the size of the resource allocation information included in the HE-SIG-B field may be small. In this case, the number of symbols of the HE-SIG-B field may be indicated in consideration of the resource allocation structure as well as the transmission bandwidth of the PPDU 910 or 920.

As the third method, the number of symbols of the HE-SIG-B field may be predetermined according to the number of stations receiving the PPDU 910 or 920, and the station receiving the PPDU 910 or 920 may identify the number of symbols of the HE-SIG-B field based on the station number indicator. For example, the number of symbols of the HE-SIG-B field may be proportional to the number of receiving stations indicated by the station number indicator. Alternatively, the number of stations receiving the PPDU 910 or 920 may be estimated based on the transmission bandwidth and the resource allocation structure of the PPDU 910 or 920 instead of the station number indicator. As the fourth method, the number of symbols of the HE-SIG-B field may be explicitly indicated by the symbol number indicator. The station receiving the PPDU 910 or 920 may identify the number of symbols of the HE-SIG-B field based on the symbol number indicator. The method for indicating the number of symbols of the HE-SIG-B field is not restricted to the above-described exemplary methods, and the number of symbols of the HE-SIG-B field may be indicated in one or a combination of various manners.

Meanwhile, the MCS of the HE-SIG-B field may vary according to the amount of information (e.g., resource allocation information, etc.) included in the HE-SIG-B field, and the MCS indicator for indicating the MCS applied to the HE-SIG-B field (or, fields subsequent to the HE-SIG-A field) may be included in the HE-SIG-A field. For example, the MCS indicator may include 1 bit information. The MCS applied to the HE-SIG-A field (e.g., 'MCS 0') may be different from that applied to the HE-SIG-B field (e.g., 'MCS 1'). For example, the MCS indicator configured as '0' may indicate the 'MCS 0', and the MCS indicator configured as '1' may indicate the 'MCS 1'. For another example, the MCS indicator may include 3 bits information. For example, the MCS indicator configured as '000,' '001,' '010,' '011,' '100,' '101,' '110,' or '111' may respectively indicate 'MCS 0,' 'MCS 1,' 'MCS 2,' 'MCS 3,' 'MCS 4,' 'MCS 5,' 'MCS 6,' or 'MCS 7.' Here, the MCS of the HE-SIG-B field may be set in reference to the link having the poorest quality among links between the AP and the respective receiving stations. The method for indicating the MCS of the HE-SIG-B field is not restricted to the above-described exemplary methods, and the MCS of the HE-SIG-B field may be indicated in one or a combination of various manners.

The HE-SIG-B field may include resource allocation information, subband information, cyclic prefix (CP) length information, subcarrier spacing information, FFT/IFFT structure indicator, etc. The resource allocation information may include at least one of time resource allocation information, frequency resource allocation information, and spatial stream allocation information. The resource allocation information may be configured for each station or for each subband (e.g., for each frequency band having 20 MHz bandwidth). The time resource allocation information may include information on a time resource allocated to a group indicated by the STA identifier (i.e., a group identifier) of the HE-SIG-A field and information on a time resource allocated to each station belonging to the group. The frequency resource allocation information may include information on a frequency resource allocated to the group indicated by the STA identifier and information on a frequency resource allocated to each station belonging to the group. The spatial stream allocation information may include information on spatial streams allocated to the group indicated by the STA identifier and information on spatial streams allocated to each station belonging to the group. Here, the spatial streams may be indicated by using the STBC and the $N_{STS}$. Therefore, the information on spatial streams may include STBC and $N_{STS}$ for each station (or, each group).

The subband information may include information (e.g., restriction information) which is common for respective subbands (e.g., a frequency band having 20 MHz bandwidth). For example, the resource allocation information which is common for respective subbands may exist redundantly in the resource allocation information, or may exist as integrated in the resource allocation information. In a case that the same number of spatial streams (e.g., 2) are allocated to respective subbands, the subband information may indicate that the number of spatial streams allocated to respective subbands is 2.

The CP length indicator may indicate the length of CPs of fields subsequent to the HE-SIG-B field (e.g., the HE-STF, the HE-LTF, the HE-SIG-C field, the payload, etc.). The length of CP may be 0.4 μs, 0.8 μs, 1.6 μs, or 3.2 μs. The CP length indicator may explicitly indicate the length of CP. Alternatively, the CP length indicator may indicate the length of CP by using 2 bits information. For example, the CP length indicator configured as '00,' '01,' '10,' or '11' may respectively indicate that the CP has the length of 0.4 μs, 0.8 μs, 1.6 μs, or 3.2 μs.

The subcarrier spacing indicator may indicate subcarrier spacing of fields subsequent to the HE-SIG-B field (e.g., the HE-STF, the HE-LTF, the HE-SIG-C field, the payload, etc.). The subcarrier spacing may be 312.5 kHz, 156.25 kHz, or 78.125 kHz. The subcarrier spacing indicator may explicitly indicate the subcarrier spacing applied to the fields. Alternatively, the subcarrier spacing indicator may indicate the subcarrier spacing by using 2 bits information. For example, the subcarrier spacing indicator configured as '00,' '01,' or '10' may respectively indicate the subcarrier spacing of 312.5 kHz, 156.25 kHz, or 78.125 kHz.

The FFT/IFFT structure indicator may indicate the size of FFT/IFFT used for fields subsequent to the HE-SIG-B field (e.g., the HE-STF, the HE-LTF, the HE-SIG-C field, the payload, etc.). For example, the size of FFT/IFFT may be 32-points, 62-points, 128-points, or 256-points. The FFT/IFFT structure indicator may explicitly indicate the size of FFT/IFFT. Alternatively, the FFT/IFFT structure indicator may indicate the size of FFT/IFFT by using 2 bits information. For example, the FFT/IFFT structure indicator configured as '00,' '01.' '10,' or '11' may respectively indicate the FFT/IFFT having the size of 32-points, 62-points, 128-points, or 256-points.

The HE-SIG-C field may include MCS information, length information, etc. of the payload. The payload may include at least one data unit. The HE-SIG-C field and the payload may be configured in unit of bandwidth (e.g., 20 MHz, 10 MHz, 5 MHz, 2.5 MHz, etc.) indicated by the resource allocation information included in the HE-SIG-B field. Meanwhile, the PPDU based on 'MIMO and OFDMA' may be structured as follows.

Figure 10:
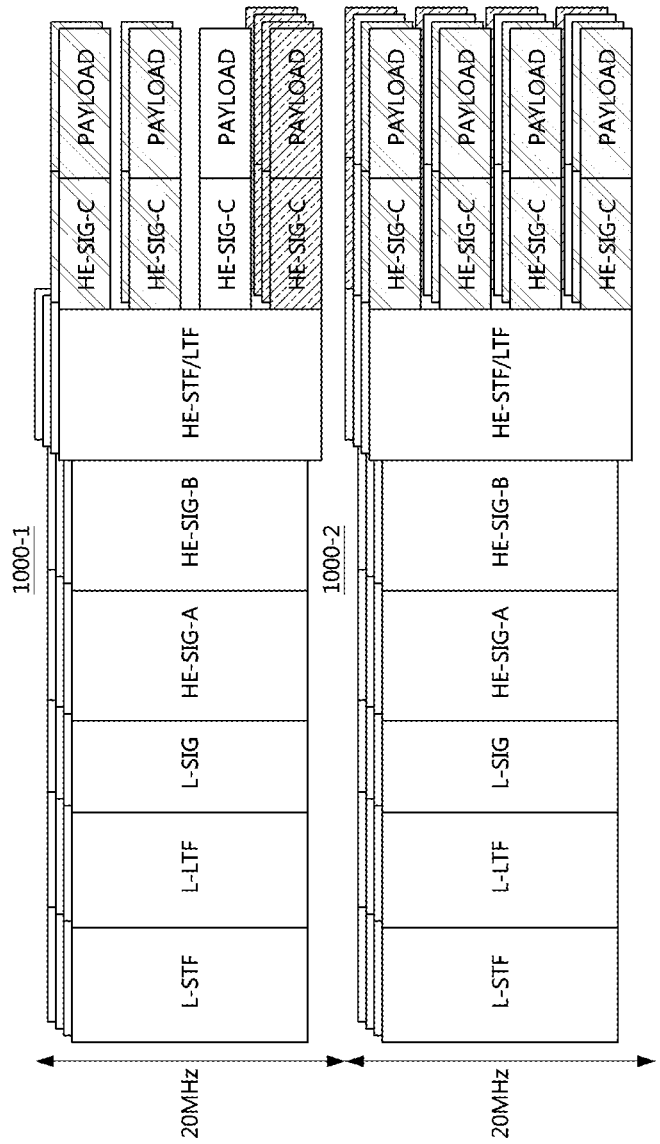
FIG. 10 is a block diagram illustrating a fourth exemplary embodiment of a PPDU.

FIG. 10 is a block diagram illustrating a fourth exemplary embodiment of a PPDU.

Referring to FIG. 10, a PPDU-1 1000-1 transmitted through a first frequency band having 20 MHz bandwidth may be transmitted based on 'SU-MIMO and OFDMA.' For example, the L-STF, the L-LTF, the L-SIG field, the HE-SIG-A field, the HE-SIG-B field, the HE-STF, and the HE-LTF of the PPDU-1 1000-1 may be transmitted through four spatial steams. The HE-SIG-C field and the payload allocated to an upper 10 MHz band of the first frequency band may be transmitted to a first STA 610 through two spatial streams, the HE-SIG-C field and the payload allocated to a medium 5 MHz band of the first frequency band may be transmitted to a second STA 620 through a single spatial stream, and the HE-SIG-C field and the payload allocated to a lower 5 MHz band of the first frequency band may be transmitted to a third STS 630 through four spatial streams.

A PPDU-2 1000-2 transmitted through a second frequency band having 20 MHz bandwidth may be transmitted based on 'MU-MIMO and OFDMA.' For example, the L-STF, the L-LTF, the L-SIG field, the HE-SIG-A field, the HE-SIG-B field, the HE-STF, and the HE-LTF of the PPDU-2 1000-2 may be transmitted through four spatial steams. The HE-SIG-C field and the payload for the first STA 610 may be transmitted through two spatial streams, the HE-SIG-C field and the payload for the second STA 620 may be transmitted through a single spatial stream, and the HE-SIG-C field and the payload for the third STA 630 may be transmitted a single spatial stream.

Re-referring to FIG. 7, the AP may transmit the PPDU 910, 920, 1000-1, or 1000-2 (S710). The STA may obtain the legacy preamble included in the PPDU received from the AP (S720), and obtain the HE preamble included in the received PPDU (S730). The STAs may identify the transmission bandwidth of the received PPDU based on the bandwidth indicator included in the HE-SIG-A field, identify that the transmission of the received PPDU is the DL transmission based on the UL/DL indicator included in the HE-SIG-A field, and identify that the transmission of the received PPDU is the OFDMA based transmission based on the OFDM/OFDMA indicator included in the HE-SIG-A field.

The STA may identify whether it is a target station of the received PPDU or not based on the STA identifier (or, the group identifier) included in the HE-SIG-A field of the received PPDU, and identify a BSS to which the AP transmitting the PPDU belongs based on the BSS identifier included in the HE-SIG-A field. Also, the STA may identify the number of symbols of the HE-SIG-B field subsequent to the HE-SIG-A field by using at least one of the bandwidth indicator, the resource allocation structure indicator, the station number indicator, and the symbol number indicator included in the HE-SIG-A field. The STA may identify the MCS of the HE-SIG-B field subsequent to the HE-SIG-A field (or, fields subsequent to the HE-SIG-A field) based on the MCS indicator included in the HE-SIG-A field, and identify whether the HE-SIG-B field is repeated or not based on the repetition indicator included in the HE-SIG-A field.

The STA may obtain the HE-SIG-B field based on information included in the HE-SIG-A field of the PPDU. The STA may identify a time resource, a frequency resource, spatial streams, etc. allocated to it based on the resource allocation information included in the HE-SIG-B field of the PPDU. Also, the STA may identify the length of CP applied to fields subsequent to the HE-SIG-B field (e.g., the HE-STF, the HE-LTF, the HE-SIG-C field, the payload, etc.) based on the CP length indicator included in the HE-SIG-B field, identify the subcarrier spacing applied to the fields subsequent to the HE-SIG-B field (e.g., the HE-STF, the HE-LTF, the HE-SIG-C field, the payload, etc.) based on the subcarrier spacing information included in the HE-SIG-B field, and identify the size of FFT/IFFT used for fields subsequent to the HE-SIG-B field (e.g., the HE-STF, the HE-LTF, the HE-SIG-C field, the payload, etc.) based on the FFT/IFFT structure indicator included in the HE-SIG-B field.

The STA may obtain the HE-STF, the HE-LTF, and the HE-SIG-C field based on the information included in the HE-SIG-B field of the PPDU. The STA may identify the MCS applied to the payload based on the MCS information included in the HE-SIG-C field of the PPDU, and identify the length of the payload based on the length information included in the HE-SIG-C field. The STA may obtain the payload based on the information included in the HE-SIG-A field, the HE-SIG-B field, and the HE-SIG-C field (S740). Upon receiving the PPDU 910, 920, 1000-1, or 1000-2 successfully, the STA may transmit an ACK frame to the AP as a response to the received PPDU.

Hereinafter, an uplink transmission method based on OFDMA will be explained.

Figure 11:
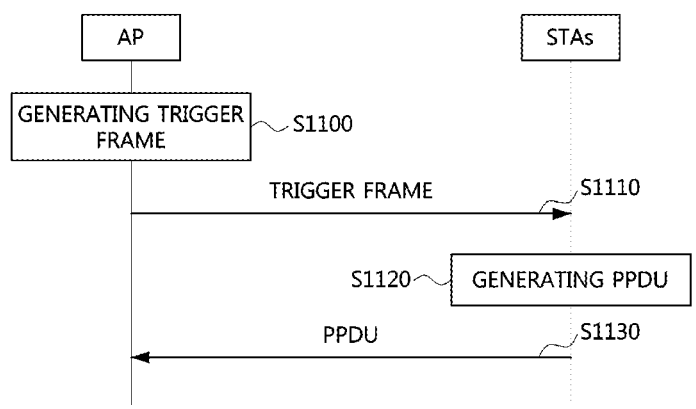
FIG. 11 is a sequence chart illustrating an exemplary embodiment of an uplink transmission method in WLAN.

FIG. 11 is a sequence chart illustrating an exemplary embodiment of an uplink transmission method in WLAN.

Referring to FIG. 11, the AP may be the access point explained by referring to FIG. 6, and the STAs may be the stations 610, 620, 630, and 640 explained by referring to FIG. 6. The AP and the STAs may construct the WLAN topology explained in FIG. 6. The AP may generated a trigger frame for triggering an uplink transmission based on OFDMA (S1100). The trigger frame may include the information (e.g., the resource allocation information, the sub-band information, the CP length indicator, the subcarrier spacing indicator, the FFT/IFFT structure indicator, etc.) included in the HE-SIG-A field, the HE-SIG-B field, and the HE-SIG-C field explained by referring to FIG. 9. The AP may transmit the trigger frame (S1110).

The STA may receive the trigger frame from the AP, and identify whether it participates the uplink MU transmission or not based on the information included in the trigger frame. When the STA identifies that it participates the uplink transmission based OFDMA, the STA may further identify a resource allocated to it based on the information included in the trigger frame. Also, the STA may generate a PPDU based on the allocated resource (S1120). Then, the first STA 610, the second STA 620, and the third STA 630 may participate in the uplink transmission based on OFDMA. For example, in a case that bandwidths 40 MHz, 20 MHz, and 20 MHz are respectively allocated to the stations 610, 620, and 630 participating in the uplink transmission, the stations 610, 620, and 630 may generate respective PPDUs as follows.

Figure 12:
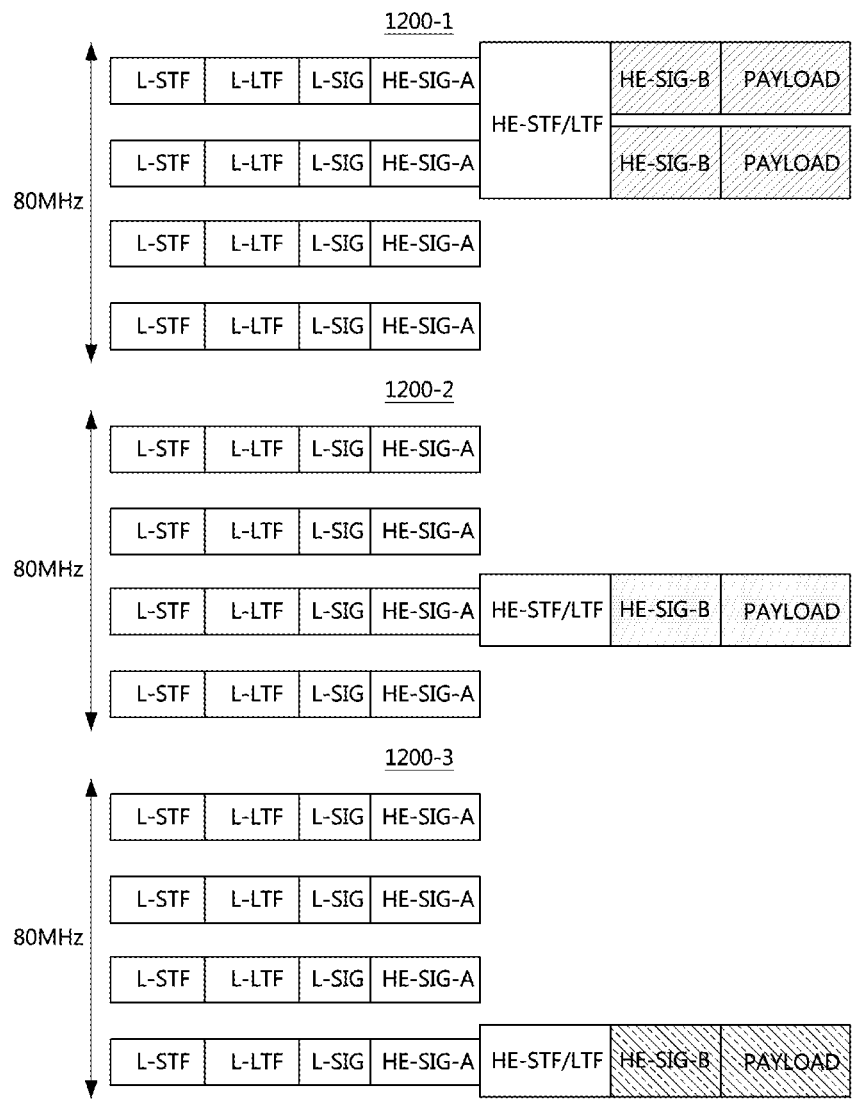
FIG. 12 is a block diagram illustrating a fifth exemplary embodiment of a PPDU.

FIG. 12 is a block diagram illustrating a fifth exemplary embodiment of a PPDU.

Referring to FIG. 12, the first STA 610, the second STA 620, and the third STA 630 may respectively generate a PPDU-1 1200-1, a PPDU-2 1200-2, and a PPDU-3 1200-3. The PPDUs 1200-1, 1200-2, and 1200-3 may be transmitted through a same frequency band having 80 MHz bandwidth. Each of the PPDUs 1200-1, 1200-2, and 1200-3 may include a legacy preamble, a HE preamble, and a payload. The legacy preamble may include a L-STF, a L-LTF, and a L-SIG field, and the fields included in the legacy preamble may be duplicated in unit of 20 MHz. The HE preamble may include a HE-SIG-A field, a HE-STF, a HE-LTF, and a HE-SIG-B field. The HE-SIG-A field may include the information elements listed in the table 1, and the HE-SIG-B field may include the information explained in FIG. 8 (e.g., MCS of payload, payload length information, etc.).

The legacy preamble and the HE-SIG-A field may be transmitted through a whole frequency band having 80 MHz bandwidth, and the HE-STF, the HE-LTF, the HE-SIG-B field, and the payload may be transmitted through respective bands allocated to the respective stations 610, 620, and 630. For example, the first STA 610 may transmit its HE-STF, HE-LTF, HE-SIG-B field, and payload by using a 40 MHz bandwidth, the second STA 620 may transmit its HE-STF, HE-LTF, HE-SIG-B field, and payload by using a 20 MHz bandwidth, and the third STA 630 may transmit its HE-STF, HE-LTF, HE-SIG-B field, and payload by using a 20 MHz bandwidth.

Re-referring to FIG. 11, the STAs may transmit the PPDUs 1200-1, 1200-2, and 1200-3 to the AP (S1130). The AP may receive the PPDUs 1200-1, 1200-2, and 1200-3 from the STAs, and obtain the payloads included in the PPDUs 1200-1, 1200-2, and 1200-3. When the AP successfully receives the PPDUs 1200-1, 1200-2, and 1200-3, the AP may respectively transmit ACK frames as responses to the PPDUs 1200-1, 1200-2, and 1200-3 to the respective STAs.

While the example embodiments of the present disclosure and their advantages have been described in detail, it should be understood that various changes, substitutions and alterations may be made herein without departing from the scope of the disclosure.

What is claimed is:

1. An operation method of a first station in a wireless local area network (WLAN), the method comprising:
    determining, by the first station, a Modulation and Coding Scheme (MCS) for a High Efficiency Signal B (HE-SIG-B) field;
    generating, by the first station, an HE Signal A (HE-SIG-A) field including an indication of the MCS for the HE-SIG-B field;
    generating, by the first station, a physical layer protocol data unit (PPDU) including a legacy preamble, a high efficiency (HE) preamble, and a payload, the HE preamble including the HE-SIG-A field and the HE-SIG-B field; and
    transmitting, by the first station, the PPDU, transmitting the PPDU including coding and modulating the HE-SIG-B field according to the MCS for the HE-SIG-B field included in the HE-SIG-A field.

2. The method according to claim 1, wherein the HE-SIG-B field is repeated in time domain.

3. The method according to claim 1, wherein the HE-SIG-B field includes resource allocation information of a station receiving the PPDU.

4. The method according to claim 1, wherein determining the MCS for the HE-SIG-B field includes determining the MCS of the HE-SIG-B field according to a quality of a link between the first station and a second station receiving the PPDU.

5. The method according to claim 1, wherein determining the MCS for the HE-SIG-B field includes determining the MCS of the HE-SIG-B field according to an amount of information in the HE-SIG-B field.

6. An operation method of a first station in a wireless local area network, the method comprising:
    receiving, by the first station, a physical layer protocol data unit (PPDU) from a second station, receiving the PPDU including:
        obtaining a legacy preamble included in the PPDU,
        obtaining a high efficiency (HE) Signal A (HE-SIG-A) field included in the PPDU,
        identifying a Modulation and Coding Scheme (MCS) according to an indication included in the HE-SIG-A field, and
        obtaining, using the MCS, an HE Signal B (HE-SIG-B) field from the PPDU; and
    obtaining, by the first station, a payload included in the PPDU based on information included in the HE-SIG-A and HE-SIG-B fields.

7. The method according to claim 6, wherein the HE-SIG-B field is repeated in time domain.

8. The method according to claim 6, wherein the HE-SIG-B field includes resource allocation information of a station receiving the PPDU.

* * * * *